Feb. 10, 1959
F. LEISTER
2,873,151
PILLOW BLOCK
Filed Nov. 16, 1955
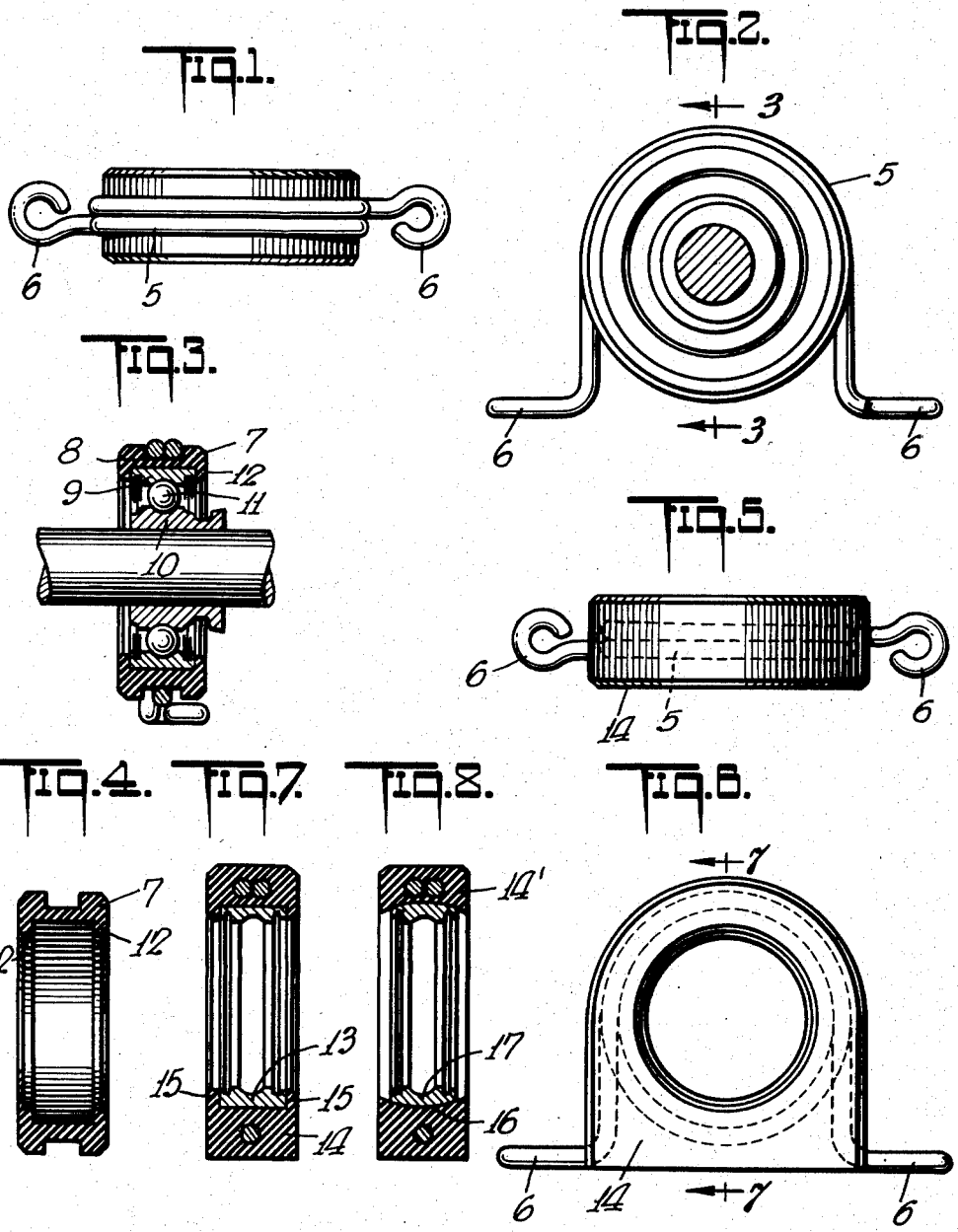
INVENTOR
Fayette Leister
BY
Mitchell Bechert
ATTORNEYS

United States Patent Office 2,873,151
Patented Feb. 10, 1959

2,873,151

PILLOW BLOCK

Fayette Leister, New Britain, Conn., assignor to The Fafnir Bearing Company, New Britain, Conn., a corporation of Connecticut Application November 16, 1955, Serial No. 547,093

2 Claims. (Cl. 308—28)

My invention relates to a bearing mounting.

It is an object of the invention to provide an improved mounting, which is exceedingly simple to construct, and which is sturdy enough to withstand handling during shipment and installation, and which will assume all normal working loads.

It is another object to provide an improved bearing mounting, which will reduce noise in operation.

Another object is to provide an improved bearing mounting permitting self-alignment of the bearing in the mounting.

A further object is to provide an improved bearing mounting, providing self-alignment in the mounting itself.

Other objects and various features of novelty and invention will be hereinafter pointed out or will become apparent to those skilled in the art.

In the drawings which show, for illustrative purposes only, preferred forms of the invention:

Fig. 1 is a top plan view of a bearing mounting illustrative of the invention;

Fig. 2 is an axial view in elevation of the bearing shown in Fig. 1;

Fig. 3 is a central, vertical, sectional view, taken substantially in the plane of the line 3—3 of Fig. 2;

Fig. 4 is a detailed view in central section of a rubber bushing shown in Figs. 1 to 3;

Fig. 5 is a view similar to Fig. 1, illustrating a modification;

Fig. 6 is a view in axial and elevation of the bearing mounting shown in Fig. 5;

Fig. 7 is a central sectional view, taken substantially in the plane of the line 7—7 of Fig. 6; and Fig. 8 is a view similar to Fig. 7, but illustrating a slightly modified construction.

The bearing mounting may consist essentially of a coil of wire 5, having one or more turns, and the ends may be formed into securing members, such as outturned feet 6—6, which may be in the form of eyes for receiving screws or the like for fastening the bearing mounting to a support. The coil mounting embraces a bearing, a part of which may have a circumferential groove therein for receiving the coil and fitting therein with sufficient tightness to secure the bearing in place.

In the form shown in Figs. 1 to 3, the bearing has its outer surface formed of rubber or the like 7, which may be in the form of a bushing shown in detail in Fig. 4, and this outer bearing part or bushing is provided with a circumferential groove 8 therein in which the wire turn or turns rest. Thus, the outer portion of the bearing is rather rigidly held against axial displacement in the coil mounting. The bearing may include also an outer bearing ring 9, inner bearing ring 10, and interposed antifriction bearing members 11. The bushing 7 may have radially inwardly directed flanges 12—12 to engage opposite edges of the metal bearing ring 9 for holding the same against axial displacement. Thus, the antifriction bearing itself, when separate from the outer ring portion 7, is rather securely held therein, and the entire bearing is held in the coil mounting.

It will be seen that the bearing will be permitted a certain degree of self-alignment by reason of the ability of the bearing to slip or turn somewhat within the coil, and the wire mounting itself may be sufficiently resilient to permit certain self-alignment of the bearing. Furthermore, with the outer portion of the bearing in the form of a rubber bushing 7, self-alignment will be permitted also by reason of the flow or give of the rubber in the bushing.

In the form shown in Figs. 5, 6 and 7, I provide the same coil 5, having feet 6—6, as heretofore described. The bearing, including the outer ring 13, is mounted in a rubber body member 14, which surrounds the bearing and holds the same preferably by means of lips 15—15, and the body 14 embeds the coil 5 therein. The body 14 is preferably flush with the bottom of the feet 6—6, as clearly appears in Fig. 6. The rubber body 14 may be integrally bonded to the coil 5, and possibly also to the outer ring 13, but preferably the outer ring 13 is a separate member simply slipped into place past the lip 15 at one side.

In the form shown in Fig. 8, the body member 14' is substantially the same as the body 14 in Fig. 7, but instead of having the inturned lips 15, the seating surface for the bearing is of generally spherical form, as indicated at 16, and the outer surface of the ring 17 is of generally spherical form, so as to freely self-align in the body 14'; otherwise the form shown in Fig. 8 is the same as that shown in Figs. 5, 6, and 7.

It will be seen, then, that I have provided a very cheap bearing mounting, which will be easy to manufacture and assemble, and which will hold the bearing with adequate security. The bearing will be permitted certain self-alignment, and when the bearing is mounted in a rubber body or housing part, the bearing will be relatively quiet in operation.

While the invention has been described in considerable detail and a preferred form illustrated, it is to be understood that various changes may be made within the scope of the invention as defined in the appended claims.

I claim:

1. In a bearing mounting, an outer bearing ring, means rotatably supported within said bearing ring, a rubber body ring surrounding said bearing ring and housing the same therein, a coil of stiffly resilient wire extending completely around said outer ring and supporting the same and separated therefrom by a part of said rubber body ring, and feet formed integrally from the wire of said coil and extending outwardly of said rubber body ring, outer portions of said feet being formed for securing to a support, whereby when secured, said bearing ring will be resiliently supported by the outwardly extending portions of said wire.

2. In the combination defined in claim 1, said coil being embedded in said body, and said feet projecting from said body.

References Cited in the file of this patent

UNITED STATES PATENTS

| 397,037 | Steussy | Jan. 29, 1889 |
| 499,549 | Hunter et al | June 13, 1893 |
| 1,636,565 | Howe | July 19, 1927 |
| 2,114,670 | Searles | Apr. 19, 1938 |
| 2,186,686 | Stanley | Jan. 9, 1940 |
| 2,211,295 | Searles et al. | Aug. 13, 1940 |